United States Patent [19]
Lee

[11] Patent Number: 5,925,420
[45] Date of Patent: Jul. 20, 1999

[54] METHOD FOR PREPARING CROSSLINKED AROMATIC POLYMERS AS LOW κ DIELECTRICS

[75] Inventor: Chung Lee, Austin, Tex.

[73] Assignee: WJ Semiconductor Equipment Group, Inc., Scotts Valley, Calif.

[21] Appl. No.: 08/679,864

[22] Filed: Jul. 16, 1996

[51] Int. Cl.⁶ ..................................................... C08F 2/46
[52] U.S. Cl. ........................... 427/493; 427/99; 427/226; 427/255.6; 427/385.5; 427/487; 427/488; 427/496; 427/509; 427/520; 427/535; 427/553; 427/570; 427/582
[58] Field of Search ..................................... 427/488, 493, 427/509, 520, 535, 553, 570, 582, 99, 226, 255.6, 385.5, 487, 496

[56] References Cited

U.S. PATENT DOCUMENTS

| | | | |
|---|---|---|---|
| 3,787,382 | 1/1974 | Wright et al. | 260/92.1 |
| 4,500,562 | 2/1985 | Jahn et al. | 427/27 |
| 5,114,780 | 5/1992 | Mercer et al. | 428/195 |
| 5,115,082 | 5/1992 | Mercer et al. | 528/219 |
| 5,145,936 | 9/1992 | Mercer | 528/86 |
| 5,155,175 | 10/1992 | Mercer et al. | 525/390 |
| 5,173,542 | 12/1992 | Lau et al. | 525/351 |
| 5,204,416 | 4/1993 | Mercer et al. | 525/390 |
| 5,264,039 | 11/1993 | Gobush et al. | 118/724 |
| 5,268,202 | 12/1993 | You et al. | 427/255.6 |
| 5,409,777 | 4/1995 | Kennedy et al. | 428/411.1 |

FOREIGN PATENT DOCUMENTS

WO 97/15951  5/1997  WIPO ......................... H01L 23/522

OTHER PUBLICATIONS

L. You, et al.; "Vapor Deposition of Parylene Films From Precursors", Materials Research Society Symposium Proc. vol. 282, 1993 pp. 593–598 (No Month avail.).

Wary, Olson, Beach; "Vacuum–Deposited Paralene AF–4: A Thermally Stable, Low Dielectric Constant Polymer for Interlayer Dielectric Use", Specialty Coating Systems, Inc., Indianapolis, IN (No date avail.).

*Primary Examiner*—Bernard Pianalto
*Attorney, Agent, or Firm*—Flehr Hohbach Test Albritton & Herbert LLP

[57] ABSTRACT

Amorphously crosslinked aromatic polymeric low κ materials and methods for their fabrication are provided. The subject materials are prepared by a modified transport polymerization process, in which aromatic precursors are pyrolyzed to produce radical comprising aromatic monomeric precursors which are then allowed to polymerize by deposition onto a substrate surface, where during and/or after deposition the growing polymer chain is exposed to a high energy crosslinking agent, such as high energy photons or plasma. The subject crosslinked materials find use in a variety of applications, particularly as low κ dielectrics in the manufacture of integrated circuits.

32 Claims, No Drawings

METHOD FOR PREPARING CROSSLINKED AROMATIC POLYMERS AS LOW κ DIELECTRICS

INTRODUCTION

1. Technical Field

The field of this invention is polymeric materials having low dielectric constants.

2. Background

Materials having low dielectric constants (low κ dielectrics) are fundamental components of integrated circuits. Such materials provide electrical isolation between components and permit high component densities by reducing or eliminating crosstalk. These materials also serve to planarize the topography of the circuit and can provide a protective role, serving as barriers to contaminants and corrosive agents.

A variety of different materials have been employed as low κ dielectrics in the fabrication of integrated circuits. $SiO_2$ based compositions are one type of low κ dielectric material finding use. However, the dielectric constants of these compositions are at least 3.5.

An alternative group of materials are the spin coated organic polymeric materials, including cross-linked spin coated organic polymeric materials, such as polyimides, fluorinated polyimides, polyquinolxalines etc . . . These polymeric materials typically have dielectric constants (κ) ranging from 2.6 to 3.0. Despite their low κ values, these polymers are not entirely satisfactory due to processing limitations, which makes spin-on polymers unsuitable for high throughput and high yield production applications. Although attempts have been made to address the problems associated with spin-on processes through the introduction of polymeric crosslinking via the use of chemical crosslinking agents, crosslinking of these spin-on polymers results in granular structures that have weaker boundaries and crack easily at polymer/metal interfaces.

Because of the disadvantages of spin-coated organic polymers, vapor phase polymerization has been explored as an alternative method for the preparation of polymeric low κ materials. Vapor phase polymerization provides polymeric materials having excellent polymer/metal contacts and high interfacial adhesion.

One particular class of polymers which has been prepared through vapor phase polymerization are the polyxylylenes (also known as paralynes) such as paralyne N, paralyne C, paralyne D and paralyne F. Paralynes have κ values ranging from 2.3 to 2.7 and are thus particularly attractive as low κ dielectric materials for use in integrated circuits. However, the paralynes that have been prepared to date have exhibited low glass transition temperatures (Tgs), high coefficients of thermal expansion (CTE), and marginal thermal stability.

As such, there is continued interest in the identification new materials, as well as methods for their fabrication, that have low κ values, high glass transition temperatures, high thermal stability and low coefficients of thermal expansion.

Relevant Literature

RD 337093 (Derwent World Patents Index Accession No: 92-197683/24) discloses a process of exposing Paralyne C vapor deposited coatings to UV light to produce relief images.

U.S. Pat. No. 5,268,202 describes a process for the vapor deposition of a Paralyne F coating from 1,4-bis (trifluoromethyl)benzene and a halogen initiator such as dibromotetrafluoro-p-xylene. The disclosed process requires the presence of a metal catalyst during the pyrolysis step. U.S. Pat. No. 5,268,202 describes transport, polymerization in the presence of a catalyst.

Various organic polymer coatings suitable for use in the manufacture of integrated circuits are reported in U.S. Pat. Nos. 5,350,604 and 5,049,632.

Various spin coated organic polymers, including cross-linked organic polymers, are reported in: WO 91/09087; WO 91/09070; WO 91/09081; WO 91/09071; WO 91/16369.

Transport polymerization is described in Lee, "Direct Polymer Coating Via Polymerization of Gaseous Intermediates," Ind. Eng. Chem. Prod. R & D (1978) 17:1; Cho et al., J. Apply Polym. Sci. (1969) 13:2325; Hertler, J. Org. Chem. (1963) 28:2877; You et al., J. Vac. Sci. Technol. (1993) All (6) 3047–3052; and Lee, "Transport Polymerization of Gaseous Intermediates and Polymer Crystal Growth," J. Macromol. Sci-Rev. Macromol. Chem. (1977/78) C16(1):79–127.

Cross linking of transport polymerized Teflon® with high energy photons from a UV source is reported in Singh & Sharangpani, "CVD of Teflon AF," in Proceedings for DUMIC (1996) 95–102.

Plasma polymerization is described in Yasuda, Plasma Polymerization (Academic Press)(1985) and Plasm Polymerization (Shen & Bell eds., ACS Symposium Series) Vol. 108 ACS (1979). Plasma sources for use in plasma polymerization are reviewed in Lieberman & Lichtenberg, Principles of Plasma Discharge and Material Processing (Wiley Interscience)(1994).

SUMMARY OF THE INVENTION

Polymeric materials having low dielectric constants (low κ materials), as well as methods for their fabrication, are provided. The low κ materials of the subject invention are organic, crosslinked polymeric materials characterized by having high glass transition temperature, high thermal stability, and low coefficient of thermal expansion values. In preparing the subject low κ materials, reactive radical containing aromatic compounds are contacted with a substrate under conditions of polymerization. As a result, an organic polymeric coating is deposited on at least one surface of the substrate. During and/or after the contacting step, the deposited polymeric material is exposed to a high energy crosslinking agent. The low κ materials find use as low dielectric layers in integrated circuits.

DESCRIPTION OF THE SPECIFIC EMBODIMENTS

Low κ materials and methods for their fabrication are provided. The low κ materials of the subject invention are characterized by being organic, polymeric amorphously crosslinked materials having high glass transition temperature (Tg), high thermal stability and low coefficient of thermal expansion (CTE) values. The subject low κ materials are prepared by contacting reactive radical containing aromatic compounds or monomers with a substrate under conditions of polymerization to deposit an organic polymeric coating on the substrate. During and/or after the contacting step, the deposited polymeric materials are exposed to a high energy cross-linking agent. In further describing the subject invention, first the low κ materials will be described in greater detail followed by a discussion of the methods employed to prepare the subject coatings.

The dielectric constant (κ) of the subject materials will be less than 3.0 (where the dielectric constant is measured under 1 MHz, 50% RH at 25° C., where the dielectric constant will typically range from about 2.0 to 3.0, usually from about 2.0 to 2.8, more usually for about 2.0 to 2.7.

The subject materials have high glass transition temperatures (Tg), high thermal stabilities, and low coefficient of thermal expansion (CTE) values. The Tg, thermal stability and CTE properties of the subject materials will be sufficient to provide for low RC delay, low power consumption and low cross-talk when the subject materials are employed in integrated circuits as low κ layers.

The Tg of the films will be greater than about 100° C., usually greater than about 100° C., and will typically range from about 200 to 350° C., usually from about 225 to 350° C., more usually from abut 250 to 350° C. The subject materials have high thermal stability, being stable under vacuum conditions at temperatures up to at least about 400° C., and will usually be stable at temperatures of about 420° C. or higher. The subject materials also exhibit low coefficients of thermal expansion (CTE), where the CTE of the materials will not exceed about 70 ppm/° C., and will usually not exceed about 65 ppm/° C., more usually about 60 ppm/° C.

The crystallinity of the subject polymeric materials will range from about 0 to 50, usually from about 10 to 40, and more usually from about 20 to 30. Importantly, because of the methods by which the subject materials are prepared, the subject polymeric materials are amorphous in nature, in that there is no pattern to the cross-linking of the polymeric chains in the subject polymers. Thus, the both inter- and intra-chain crosslinking may be present in the subject polymers. The crosslink density of the subject amorphously crosslinked materials will necessarily depend on the crystallinity of the subject materials and will be controlled to provide for materials having the desired Tg and CTE values, but will usually be at least about 2%, more usually at least about 5% and may be as high as 50% or higher, but will usually not exceed 40%, and will more usually not exceed 30%.

For the most part, the subject polymeric amorphously crosslinked aromatic materials will comprise crosslinked polymers having the following repeat unit:

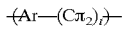

wherein:

Ar is an aromatic moiety of from 1 to 4 rings, preferably 1 to 2 rings, where when more than one ring is present, preferably at least two of the rings are fused, where one or more of the annular ring members may be substituted;

each π is independently H or halogen, usually chlorine, bromine or fluorine, preferably fluorine; and t is from 1 to 2;

where a portion of the repeat or monomeric units, depending on the extent of crosslinking in the polymer, will be covalently bonded to at least three different repeat units, as opposed to the above repeat unit which is shown to be bonded to only two different moieties.

In one embodiment of the subject invention, the amorphously crosslinked aromatic polymeric material will comprise monomeric repeat units of the formula:

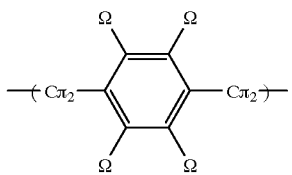

wherein π is as defined above; and each Ω is independently H, Cl, Br, F, SiH$_{3-8}$(OR)q;

wherein q is an integer of from 1 to 3 and R is a lower alkyl, preferably a C$_1$ alkyl, which may be substituted, preferably halo substituted, more preferably fluoro substituted.

In another embodiment of the subject invention, the amorphously crosslinked aromatic polymeric material will comprise monomeric repeat units of the formula:

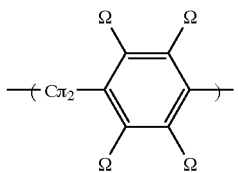

wherein each of the symbols are as defined previously.

Although the subject materials may be fabricated in a variety of different shapes, in view of the methods by which they are prepared and the applications in which they are employed, for the most part the subject materials will be in the form of films or coatings, where the thickness of the films will generally range from about 0.01 to 100 μm, usually from about 0.1 to 3 μm, and more usually from about 0.2 to 1 μm, depending on the particular conditions of film preparation. Thus, as used herein, the term film refers to a variety of different objects ranging from ultrathin coatings on substrates to thick layers or slabs of polymer material, which may be further processed into other shapes depending on the intended use of the material.

The subject materials may be prepared from a variety of thermally stable alkyl substituted aromatic compounds. Aromatic compounds finding use in the subject invention will be those compounds capable of being pyrolyzed to radical containing aromatic compounds, where the number of radicals following pyrolysis will usually range from 1 to 4, more usually 1 to 3, including monoradical containing aromatic compounds, diradical containing aromatic compounds, triradical containing aromatic compounds, aromatic mono-, di-, triradicals, and the like. Thermally stable alkyl substituted aromatic compounds of interest may be mono or polycyclic, wherein polycyclic compounds may comprise from 2 to 4 rings, usually 2 to 3 rings, where at least two of the rings may be fused. The rings may be carbo or heterocyclic, with heteroatoms generally being nitrogen or chalcogen, usually nitrogen, oxygen or sulphur. The aromatic compounds may be substituted with 1 to 2 or more alkyl groups, where the alkyl substituents will, for the most part, be lower alkyls, preferably C$_1$ alkyls. In addition to the alkyl substituents, the aromatic atoms of the subject compounds may be further substituted, up to per- substituted, where additional substituents of interest include halogen, particularly chlorine, bromine and fluorine, silyl, carboxy, alkoxy, thio and the like. Representative compounds of interest include xylenes, toluenes, napthalenes, indazoles, imides and the like.

For the most part, the aromatic compounds employed will have the following formula:

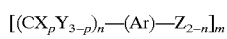

wherein:

Ar is an aromatic moiety selected from the group consisting of;

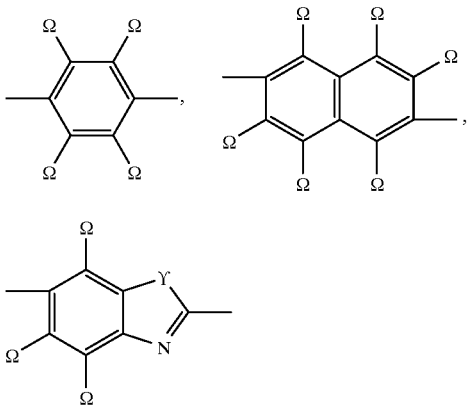

wherein Ω has the meaning provided above, and γ is N, O or S;

n is from 1 to 2;

X is —H, —F, —Br or —Cl, preferably —F;

Y is —H or —F, preferably —F;

p is an integer of from 1 to 3; and Z is —H, —Cl, —Br, —COOH, —OR, or —SiR, wherein R is a lower alkyl, preferably $C_1$, which may be halo-substituted, where Z is preferably —Br;

and m is 1 to 2, wherein when m is 2, each Y is replaced by a bond joining the two aromatic moieties to form a dimer.

In one particular embodiment of the subject invention, of interest are xylene precursors, where the xylene precursors may be monomers or dimers having one or more substituents, where the substituents may be located at the methyl or phenylene positions of the xylene structure. Substituent groups that may be located at the methyl and/or phenylene positions include halogens such as fluorine, chlorine, bromine, preferably fluorine. Additional substituents that may be present at the phenylene positions only include silanes, particularly oxyalkyl substituted silanes, having one or more oxyalkyl substituents, usually lower alkoxy substituents, preferably methoxy substituents, where the lower alkyl substituents may be halosubstituted.

Monomer paraxylene precursors will, for the most part, have the following formula:

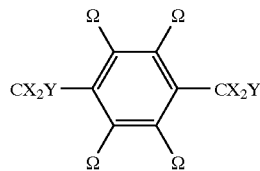

wherein:

X, Y and Ω have the same meaning as above.

In one particular embodiment of the subject invention, one or more Ω are replaced by

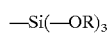

wherein R is as defined previously.

Dimers finding use as paraxylyl radicals in the subject invention will, for the most part, be of the formula:

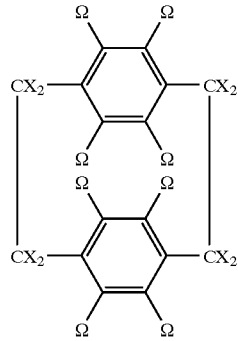

wherein X and Ω are as described above.

Specific paraxylyl monomers of interest include: $F_3C—C_6F_4—CF_3$; $F_3C—C_6H_4—CF_3$; $BrH_2C—C_6F_4—CF_2BR$; $BrH_2C—C_6H_4—CF_2Br$; $BrF_2C—C_6F_4—CF_2Br$; $BrF_2C—C_6H_4—CF_2Br$; and the like. Specific paraxylyl dimers of interest include: $(F_2C—C_6F_4—CF_2)_2$, $(F_2C—C_6F_4—CH_2)_2$, $(F_2C—C_6H_4—CF_2)_2$ $(F_2C—C_6H_4—CH_2)_2$, and the like.

In another embodiment of the subject invention, toluene compounds and derivatives thereof are of interest. These compounds, for the most part, have the formula:

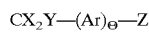

wherein:

Θ is an integer between 1 and 4, usually between 1 and 2; and each of the remaining symbols are as defined previously.

Specific monomers of interest include: $CF_3—C_6H_4—X$, $CF_2Y—C_6H_4—X$, $CF_2Y—C_6F_4—X$, $CF_3—C_6F_4—X$, $CF_3—(C_6H_4)_n—C_6H_4—X$, $CF_2Y—(C_6F_4)_nC_6F_4—X$, $CF_2Y—(C_6H_4)_nC_6H_4—X$, and $CF_3—(C_6F_4)_nC_6F_4—X$; wherein X and Y are as defined previously and n is from 1 to 4, preferably 1 to 2.

Other thermally stable alkyl substituted aromatic precursor compounds of interest include napthalenes, particularly halo substituted napthalenes, up to and including per halo, particularly perfluoro substituted napthalenes.

Thermally stable alkyl substituted aromatic compounds of interest having heterocyclic moieties include compounds of the following formula:

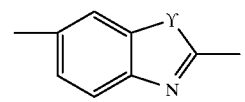

wherein X and Y are as defined above; and

Y is O, S or N.

In addition to the above aromatic compounds, a portion of the total aromatic precursors may be replaced with one or more multifunctional aromatic compounds capable of being pyrolyzed to an aromatic precursor comprising more than two, usually 3 radical containing moieties, of the formula:

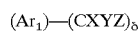

wherein $Ar_1$ is an aromatic moiety of at least 6 annular atoms;

X, Y and Z are as defined previously, wherein X and Y are preferably H or F and Z is preferably Br; and δ is an integer of at least 3 and may be as great as the number of annular atoms of $Ar_1$.

In instances where only the above multifunctional aromatic compounds are used as precursors, sufficient crosslinking of the deposited polymeric chains during deposition may occur without the exposure to a high energy crosslinking source. Thus, in such instances one can obtain the desired low κ dielectric materials by transport polymerization of the multifunctional function aromatic percursor compounds.

The first step in preparing the subject materials is to pyrolize the precursor compounds to produce reactive diradicals. The temperature at which the precursors are pyrolyzed will depend on whether monomer or dimer precursors are employed, as well as the particular nature of the precursors employed, but will be sufficient to convert substantially all of the monomer or dimer precursors to reactive aromatic diradicals. Generally, pyrolysis will be carried out a temperature of at least about 200° C., usually at least about 300° C., where pyrolysis may be carried out at temperatures as great as 900° C., depending on the particular precursor being pyrolyzed. For monomer precursors, pyrolysis will, for the most part, be carried out at temperatures ranging from about 200 to 900° C., usually from about 300 to 700° C., while for dimers pyrolysis will usually be carried out at temperatures ranging from about 200 to 890° C., usually 350 to 700° C., more usually 400 to 680° C.

Pyrolysis of the aromatic precursors is carried out under conditions in which the pyrolysis environment is substantially free of potentially contaminating agents, wherein exemplary potentially contaminating agents include oxidants and the concentration of these agents in the pyrolysis environment is less than about 1000 ppm, usually less than about 400 ppm, and preferably less than about 100 ppm. Importantly, steps are taken to ensure that pyrolysis is carried out under substantially oxygen free conditions. Accordingly, the oxygen content of the pyrolysis environment will be less than about 1000 ppm, usually less than about 400 ppm, and more usually less than about 100 ppm.

In some instances, e.g. where monomer precursor compounds are employed, it may be desirable to include in the pyrolysis environment a catalyst, where the catalyst serves to reduce the temperatures necessary to produce the reactive diradicals and/or reduce the level of metal contamination in the final product. Catalysts of interest include: transition metals, such as Cu, Co, Ni, Ag, Ti, Cr and Fe, and the like as well as alloys thereof, such as Cu(Ni), Ni and the like; and thermally stable metals such as W, Ni and the like; with Cr, Ni, W and Cu(Ni) alloy being preferred.

In the next step of the subject process, the reactive aromatic diradicals produced in the pyrolysis step are contacted with a substrate under conditions of polymerization. In this contacting step, the reactive aromatic diradicals are transported to a polymerization zone or region, where the polymerization zone is characterized by having present therein a substrate which serves as at least a mechanical support for the to be deposited crosslinked polymeric materials, where the conditions in the polymerization zone are such that the reactive diradicals polymerize on the substrate surface.

The particular conditions of polymerization in the polymerization zone will be dependent a number of parameters, including the reactive diradical monomer pressure, as well as the substrate conditions, including the thermal conductivity and thickness of the substrate, as well as the method of cooling. In the polymerization zone, the temperature of the substrate onto which the reactive diradicals are deposited to produce the polymers will be maintained at a sufficiently low temperature such that upon contact with the substrate, the reactive diradicals react to produce a polymer chain. The temperature at which the substrate is maintained will generally range from about −30° C. to 25° C., usually from about −20 to 0° C., more usually from about −15 to −5° C. The monomer pressure (pressure of reactive diradicals) during contact will range from about 1 to 100 mTorrs, usually from about 10 to 80 mTorrs, and more usually from about 20 to 50 mTorrs. As with the pyrolysis step, the atmosphere under which polymerization occurs will be substantially free of oxygen.

The substrate with which the reactive diradicals are contacted under the above polymerization conditions will at least serve as a mechanical support for the forming polymer. A variety of substrates may be employed, including metals, semiconductors, plastics, composites, ceramics, and the like. Particular materials of interest from which the substrates may be fabricated include aluminum, copper, silver, gold, silicon, germanium, silicon oxide, gallium arsenide, alumina, silicon carbide, aluminum nitride, glass, quartz, rubber, and the like. Where the polymer is intended to be used as a coating, the substrate will typically be the object to be coated. Thus, objects that may serve as the substrate include: electronic components, e.g. integrated circuits, printed wiring circuit boards, ceramic circuit boards, and the like; medical devices; artifacts; and the like.

After the deposited crosslinked material achieves sufficient mass, e.g. a film of desired thickness has been obtained, the contacting step may be terminated by stopping the flow of reactive aromatic diradicals into the polymerization zone.

Critical to the subject invention is the exposure of the deposited polymer to one or more, usually one, high energy crosslinking agents at least one of during or after the polymerization or contacting step. Thus, the deposited polymer can be exposed to the crosslinking agent during deposition, after deposition or both during and after deposition. Exposure of the deposited polymer to the high energy crosslinking agent provides for a crosslinked final polymer material that exhibits the desirable properties discussed above, e.g. high Tg. high thermal stability, low CTE, and the like. The high energy crosslinking agent to which the deposited polymeric material is exposed will be sufficient to provide for a crosslinked polymer that has a crosslink density, i.e. mole fraction of monomer units that are crosslinked, of from about 1 to 50, usually from about 5 to 35, more usually from about 10 to 25. High energy crosslinking agents of interest include high energy photons, plasma, and the like.

Where high energy photons are employed as the crosslinking agent, the polymer will be exposed to the high energy photons for a sufficient period of time to achieve the desired level of crosslinking. Generally, the polymer will be exposed to the high energy photons for at least about 1 min, usually at least about 5 min, where the exposure time may be as long as 140 to 160 min or longer, but will generally not exceed 60 min, and will usually not exceed 30 min. The energy levels of the photons will generally be comparable with the energy levels found in the majority of the chemical bonds in the diradicals. Generally, the amount of energy delivered to the material will range from 1 $J/cm^2$ to 10 $kJ/cm^2$, usually from about 30 $J/cm^2$ to 3 $kJ/cm^2$, more usually from about 100 $J/cm^2$ to about 1 $kJ/cm^2$. Any convenient high energy photon source may be employed, where such sources include: UV sources, such as arc mercury vapor lamps and tungsten halogen lamp; excimer lasers and the like.

Another high energy crosslinking agent that finds use in the subject invention is plasma. As where high energy photons are employed as the crosslinking agent, plasma exposure of the polymer material may be continuous or discontinuous during chain polymerization, and/or after deposition, where the total exposure time will be sufficient to achieve the desired level of crosslinking in the final material. Where plasma is used as a high energy crosslinking agent, a number of parameters may be modulated to control the nature of the final deposited film. These parameters include the specific gas employed as the plasma, the gas flow rate, the discharge power of the plasma, the plasma duration, and the like, and will be selected in view of the parameters discussed above concerning the conditions under which the reactive paraxylyl diradicals polymerize through deposition onto the substrate, i.e. the temperature and pressure of the deposition zone, the temperature of the substrate and the like.

Generally, the gas employed for the subject plasma will be a gas which is not itself plasma polymerizable, so that it is not incorporated into the cross-linked paraxylylene polymer being deposited on the substrate surface. Nonpolymerizable gases that find use include noble gases, such as argon, helium and the like.

To enhance the degree of crosslinking of the final material, following deposition, the temperature of the material may be raised while the material is exposed to the high energy crosslinking agent. Generally, the temperature will be raised to between 25 and 350° C., usually between about 250 and 350° C.

The resultant crosslinked aromatic polymeric materials find use in a variety of applications, including as coatings for use in metal equipment, artifact preservation, and, particularly, as low κ materials for use in the manufacture of integrated circuits, finding use as intermetal- and interlayer dielectrics, and the like. The Si comprising crosslinked paraxylenes of the subject invention find particular application as dielectric layers juxtaposed to metal or silicon comprising layers, such as Cu, Al and the like.

The following examples are offered by way of illustration and not by way of limitation.

EXPERIMENTAL

EXAMPLE 1

UV Induced Crosslinking of PPX-C Films

Free standing films of Parylene C (prepared from the transport polymerization of PPX-C monomer, Himont, Italia S.R.C., Via Rosellini, 19, Italy using the ParaTech LabTop 3000 parylene deposition system, ParaTech Coating, Inc. 35 Argonaut, Aliso Viejo, Calif. 92656) or PPX-C were exposed to ultraviolet light generated from a metal halide lamp, which provided about 150 mW/cm$^2$ of irradiance. The length of the films was measured after various degrees of exposure and the results are provided in Table 1 in terms of % shrinkage versus the total amount of energy to which the film was exposed.

TABLE 1

| E (J/cm$^2$) | % shrinkage |
|---|---|
| 10.5 | 0.15 |
| 16 | 0.7 |
| 31.5 | 1.6 |
| 32 | 2.1 |
| 63 | 3.3 |
| 91 | 3.5 |

The above results suggest that crosslinking is occurring as a result of UV exposure.

EXAMPLE 2

A PPX-N (Parylene N) film on a wafer was prepared from deposition of (2,2)-paracylophane using a transport polymerization system from ParaTech Coating, Inc. The warpage of the wafer was measured as the radius of curvature (R) after deposition. The R was monitored after the film on the wafer was exposed to various amounts of UV (fluency). The relationship between R and fluency was established, and is provided in Table 2.

TABLE 2

| E (J/cm$^2$) | R (m) |
|---|---|
| 0 | 901 |
| 31 | 1521 |
| 42 | 1650 |

The changes in curvature of the radius demonstrate film densification and shrinkage due to crosslinking.

EXAMPLE 3

Cross-Linking During Transport Polymerization

Cross linking during transport polymerization was performed using a modified ParaTech Coating Inc. deposition system. The deposition conditions were as follows: 1) the dimer (2,2-paracyclophane) was kept in the vaporizer at temperatures ranging from 139 to 145° C.; 2) the pyrolyzer was maintained at around 636 to 640° C.; 3) all other connecting areas were heated to at least 140° C. to prevent unwanted deposition; 4) the chamber pressure was kept under 35 to 41 mTorrs; 5) the chuck used to cool the wafer was kept at −30 to −35° C.; 6) and the cold trap was maintained at −50 to −60° C.

The deposited films on the wafer were exposed to various amounts of fluency for 5 different deposition runs. During the deposition, UV irradiation resulted in an increase in wafer temperature from 0 to about 20° C.

The total deposition time was around 30 min. The UV lamp on top of the chamber irradiated through a quartz plate about 47 mW/cm$^2$ of irradiance to the top of the wafer. The amount of fluency was monitored by a shutter under the UV lamp that sited on the top of the chamber.

The refractive index and film thickness were measured over several spots on the wafers. The results from the center are provided in Table 3.

TABLE 3

Adhes-

| UV-on time (sec) | UV-off time (sec) | Shutter open time (%) | Total Fluency (J/cm²) | Film Thickness (μm) | ion on SiO₂ wafer† (in CF) | Refractive Index (n) |
|---|---|---|---|---|---|---|
| 20 | 40 | 33 | 27.92 | 0.741 | 0% | 1.6635 |
| 6 | 14 | 30 | 25.38 | 0.7457 | 25% | 1.6640 |
| 36 | 82 | 30.5 | 25.8 | 0.7015 | 0% | 1.6644 |
| 12 | 48 | 20 | 16.92 | 1.2631 | 100% | 1.6620 |
| 0 | 60 | 0 | 0 | 1.4085 | 100% | 1.6382 |

†Measured by ASTM (scotch tape) test, where CF is cohesive failures.

The above results demonstrate that film thickness decreases, while refractive index increases, in a manner proportional to the fluency, which indicated cross-linking during deposition. The results thus demonstrate that film densification can be achieved during and/or after film deposition, which provide for films having higher Tg and lower CTE compared to uncrosslinked transport polymerized films.

The above results and discussion demonstrate that improved crosslinked aromatic polymeric materials having low dielectric constant values are provided. The subject amorphously crosslinked aromatic polymeric materials are uncomplicated to prepare, are defect free and find use in a variety of applications. The subject crosslinked materials find particular application in the fabrication of integrated circuits because of their low dielectric constants, high Tgs, high thermal stability and low CTEs, which provide for excellent adhesion.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method for preparing an organic low κ polymeric material, said method comprising:

pyrolyzing aromatic compounds of the formula:

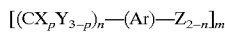

wherein:

Ar is an aromatic moiety selected from the group consisting of:

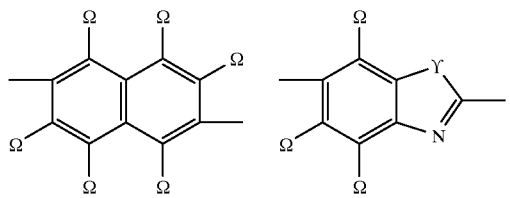

wherein Ω is independently H, Cl, Br, F, $SiH_{3-q}(OR)_{q}$ wherein q is an integer between 1 and 3 and R is a lower alkyl and Y is O, S, or N;

n is from 1 to 2;

X is —H, —F, —Br or —Cl;

Y is —H or —F;

p is an integer of from 1 to 3;

and Z is —H, —Cl, —Br, —COOH, —OR, or —SiR, wherein R is a lower alkyl;

and m is 1 to 2, wherein when m is 2, each Y is replaced by a bond joining the two aromatic moieties to form a dimer, whereby reactive diradicals are produced;

contacting a substrate with said reactive aromatic diradicals under conditions of polymerization, whereby an organic polymeric layer is deposited on at least one surface of said substrate, and exposing said polymeric layer at least one of during and after said contacting step to a crosslinking agent comprised of high energy photons for sufficient time to produce a crosslinked aromatic polymeric material;

whereby an organic low θ polymeric material is produced having a dielectric constant of equal to or less than 3.0.

2. The method according to claim 1 wherein said exposing further comprising heating said organic polymeric layer during said exposing to a temperature in the range of approximately 20° C. to 350° C.

3. The method according to claim 1 wherein said high energy crosslinlding agent comprises energy levels in the range of approximately 1 J/cm² to 100 J/cm².

4. The method according to claim 1 wherein the sufficient time of said exposing step is in the range of approximately 1 to 160 minutes.

5. The method according to claim 1 wherein said contacting step further comprising:

maintaining said substrate at a tempe in the range of approximately −30° C. to 25° C., and maintaining said reactive diradicals at a pressure in the range of approximately 1 to 100 mTorr during said contacting step.

6. The method according to claim 1 said pyrolyzing is carried out at a temperature in the range of approximately 200° C. to 900° C.

7. The method according to claim 1, wherein said pyrolyzing occurs in the presence of a catalyst.

8. The method according to claim 1, wherein n is 2 and m is 1.

9. The method according to claim 1, wherein n is 2 and m is 2.

10. The method according to claim 1, wherein n is 1 and m is 1.

11. The method according to claim 1, wherein a portion of said aromatic compounds are replaced by a multifunctional aromatic compound of the formula:

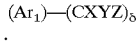

wherein $Ar_1$ is an aromatic moiety of at least 6 annular atoms;

X and Y are H or F and Z is Br; and

δ is an integer of at least 3.

12. The method according to claim 1 wherein Z is further comprised of $CF_2$.

13. The method according to claim 1 wherein in the instance where said dimer is formed, said dimer is selected from the group consisting of: $(F_2C—C_6F_4CF_2)_2$, $(F_2C—C_6F_4—CH_2)_2$, $(F_2C—C_6H_4—CF_2)_2$, and $(F_2C—C_6H_4—CH_2)_2$.

14. A method for preparing an organic low κ polymeric material, said method comprising:

pyrolyzing aromatic monomers of the formula:

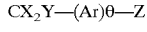

in the presence of a catalyst to produce reactive aromatic diradicals, where Θ is an integer between 1 and 4, X is —H, —F, —Br or —Cl; Y is —H or —F; Z is —H, —Cl, —Br, —COOH, —OR, or —SiR, wherein R is a lower alkyl and where Ω is H, F or $SiH_{3-q}(OR)_q$, and $q$ is an integer from 1 to 3; and Ar is an aromatic moiety selected from the group consisting of:

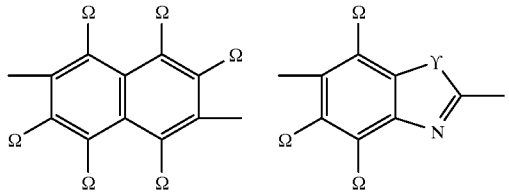

contacting a substrate with said reactive aromatic diradicals under conditions of polymerization, whereby an organic polymeric layer is deposited on at least one surface of said substrate, and exposing said polymeric layer at least one of during and after said contacting step to a high energy crosslinking agent for sufficient time to produce a crosslinked aromatic polymeric material;

whereby an organic low κ polymeric material is produced having a dielectric constant of equal to or less than 3.0.

15. The method according to claim 14 wherein said aromatic monomers are selected from the group consisting of: $CF_3—C_6H_4—X$, $CF_2Y—C_6H_4—X$, $CF_2Y—C_6F_4—X$, $CF_3—C_6F_4—X$, $CF_3—C_6F_4—X$, $CF_3—(C_6H_4)_nC_6H_4—X$, $CF_2Y—(C_6F_4)_nC_6F_4—X$, $CF_2Y—(C_6H_4)_nC_6H_4—X$, and $CF_3—(C_6F_4)_nC_6F_4—X$.

16. The method according to claim 14, wherein said high energy crosslinking agent is high energy photons.

17. A method for preparing an organic low κ polymeric material, said method comprising:

pyrolyzing xylene aromatic dimers of the formula:

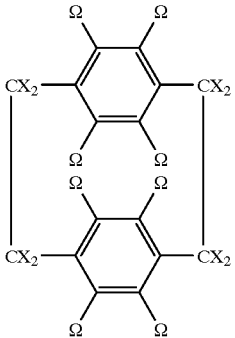

in the presence of a catalyst to produce reactive aromatic diradicals;

wherein Ω is H, F Cl, Br or $SiH_{3-q}(OR)_q$, wherein q is an integer of from 1 to 3 and R is a lower alkyl, X is H, F, BR or Cl, and Y is H or F, contacting a substrate with said reactive aromatic diradicals under conditions of polymerization, whereby an organic polymeric layer is deposited on at least one surface of said substrate, and exposing said polymeric layer at least one of during and after said contacting step to a crosslinking agent comprised of high energy photons for sufficient time to produce a crosslinked aromatic polymeric material;

whereby an organic low κ polymeric material is produced having a dielectric constant of equal to or less than 3.0.

18. The method according to claim 17 wherein said paraxylyl dimers are selected from the group consisting of: $(F_2C—C_6F_4—CF_2)_2$, $(F_2C—C_6F_4—CH_2)_2$, $(F_2C—C_6H_4—CF_2)_2$, and $(F_2C—C_6H_4—CH_2)_2$.

19. A method for preparing an organic low κ polymeric material, said method comprising:

pyrolyzing xylene aromatic monomers of the formula:

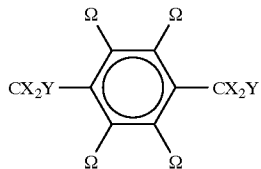

in the presence of a catalyst to piuduce reactive aromatic diradicals;

wherein Ω is H, F Cl, Br or $SiH_{3-q}(OR)_q$, wherein q is an integer of from 1 to 3 and R is a lower alkyl, X is H, F, BR or Cl, and Y is H or F, contacting a substrate with said reactive aromatic diradicals under conditions of polymerization, whereby an organic polymeric layer is deposited on at least one surface of said substrate, and exposing said polymeric layer at least one of during and after said contacting step to a crosslinking agent comprised of high energy photons having an energy level in the range of approximately 1 $J/cm^2$ to 100 $J/cm^2$ for a time in the range of approximately 1 to 160 minutes to produce a crosslinked aromatic polymeric material;

whereby an organic low κ polymeric material is produced having a dielectric constant of equal to or less than 3.0.

20. The method according to claim 19 wherein said xylene aromatic monomers are selected from the group consisting of: $F_3C—C_6F_4—CF_3$; $F_3C—C_6H_4-CF_3$; $BrH_2C—C_6F_4 —CF_2BR$; $BrH_2C—C_6H_4—CF_2Br$; $BrF_2C—C_6F_4—CF_2Br$, and $BrF_2C—C_6H_4—CF_2Br$.

21. The method according to claim 19 said pyrolyzing is carried out at a temperature in the range of approximately 200° C. to 900° C.

22. The method according to claim 19 wherein said pyrolizing occurs in the present of a catalyst selected from the group consisting of Cu, Co, Ni, Ag, Ti, Cr, Fe, W and alloys thereof.

23. The method according to claim 19 wherein said contacting step further comprising: maintaining said substrate at a temperature in the range of approximately –30° C. to 25° C., and maintaining said reactive diradicals at a pressure in the range of approximately 1 to 100 mTorr during said contacting step.

24. The method according to claim 19 wherein said exposing further comprising heating said organic polymeric layer during said exposing to a temperature in the range of approximately 20° C. to 350° C.

25. A method for preparing an organic low κ polymeric material, said method comprising:

pyrolyzing heterocyclic moieties of the formula:

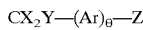

where Ar is:

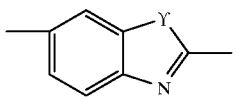

in the presence of a catalyst to produce reactive aromatic diradicals;

wherein X is H, F, BR or Cl, Y is H or F; Z is H Cl, Br, COOH, OR, or SiR, wherein R is a lower alkyl and Y is O, S or N;

contacting a substrate with said reactive aromatic diradicals under conditions of polymerization, whereby an organic polymeric layer is deposited on at least one surface of said substrate, and exposing said polymeric layer at least one of during and after said contacting step to a high energy crosslinking agent for sufficient time to produce a crosslinked aromatic polymeric material;

whereby an organic low κ polymeric material is produced.

26. The method according to claim 25 wherein said high energy crosslinking agent is high energy photons.

27. The method according to claim 25 Wherein said high energy crosslinking agent is plasma.

28. The method according to claim 25 wherein said high energy crosslinking agent comprises energy levels in the range of approximately 1 J/cm² to 100J/cm².

29. The method according to claim 25 wherein said exposing step further comprises heating said polymeric layer during said exposing to a temperature in the range of approximately 20° C. to 350° C.

30. The method according to claim 25 wherein said catalyst is selected from the group consisting of Cu, Co, Ni, Ag, Ti, Cr, Fe, W and alloys thereof.

31. The method according to claim 25 wherein said pyrolyzing step is carried out at a temperature in the range of approximately 200° C. to 900° C.

32. The method according to claim 25 wherein said contacting step further comprises:

maintaining said substrate at a temperature in the range of approximately −30° C. to 25° C.; and maintaining said reactive diradicals at a pressure in the range of approximately 1 to 100 mTorr during said contacting step.

* * * * *